Patented May 6, 1947

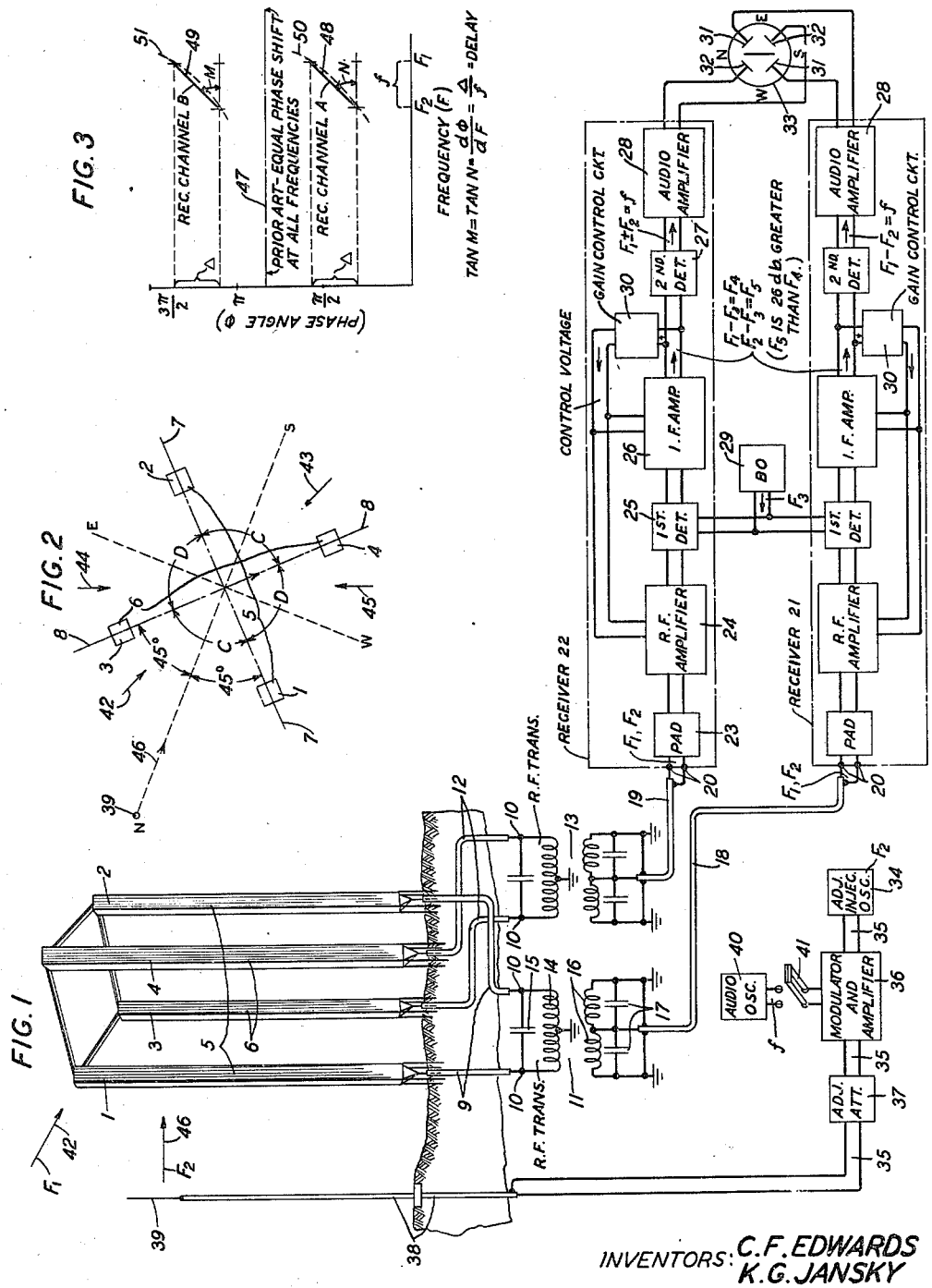

2,419,946

UNITED STATES PATENT OFFICE 2,419,946

HIGH-FREQUENCY DIRECTION FINDER

Charles F. Edwards, Red Bank, and Karl G. Jansky, Little Silver, N. J., assignors to Bell Telephone Laboratories, Incorporated, New York, N. Y., a corporation of New York Application February 17, 1942, Serial No. 431,194

11 Claims. (Cl. 250—11)

This invention relates to direction finders and more particularly to high frequency and ultrahigh frequency direction finders.

As is known, high frequency direction finders are generally divided into two groups, namely, the "phase-angle comparison" type and the "amplitude comparison" type. The copending application Serial No. 741,372, H. T. Budenbom, filed August 25, 1939, and Patent 2,234,654, W. Runge, March 11, 1941, illustrate the phase-angle comparison type and United States Patent 2,234,587, H. T. Budenbom, March 11, 1941, and 2,213,874, C. F. A. Wagstaffe, September 3, 1940, illustrate the amplitude comparison type. Briefly, in the phase-angle comparison type, a pair of currents having a phase-angle relation representing wave components received by spaced non-directional antennas are supplied to a phase indicator, the phase-angle relation of the currents being dependent upon and representative of the path or line-direction of the wave and the current amplitudes being equal or unequal. In the amplitude comparison system, a pair of currents received on antennas having dissimilar directive characteristics, or angularly related similar characteristics, are supplied to the indicator, the currents having an amplitude relation and an instantaneous phase polarity relation representing the wave line-direction. In general, assuming cathode ray tube indicators are used in both types of systems, the shape (circular, elliptical or linear), and not the orientation, of the pattern obtained in the phase comparison system indicates the wave direction provided, of course, that the currents supplied to the indicator, hereinafter termed "indicator currents," have a phase-angle relation corresponding to that of the received energies. On the other hand, in the conventional amplitude direction finding system, the orientation of the longest axis of the trace, rather than the shape or contour of the trace, indicates the wave direction, provided the separate receiving channels have equal gains and function to preserve the instantaneous polarity relation of the received energies. While a linear trace is theoretically obtainable in the amplitude system with the phase-angle shifts in the two receiving channels equal, such a trace has not always been obtained in the past because of the difficulty of constructing receiving channels having equal phase-angle shifts, or phase shifts differing only a few degrees, at the received high frequency or at the several high frequencies in a band of frequencies. In accordance with the present invention, the relative phase shift requirement for this type of direction finder is changed or reduced from one permitting only a few degrees shift at a high frequency to one permitting a few degrees shift at an audio frequency. The shift at an audio frequency corresponds to a shift of several thousand degrees at the high frequency, whereby a linear trace is more easily obtained.

In addition, in the amplitude system, an exact correlation between the amplitude relation of the indicator currents and the amplitude relation of the received energies is required for successful operation. In the phase-angle comparison system, the amplitudes of the indicator currents may, as stated above, be unequal, but these amplitudes are preferably made equal in order that, with the antenna in a so-called off-bearing position, the degree of deviation from the in-bearing position may be accurately gauged. Inasmuch as it is not feasible and is in fact exceedingly difficult, if not for all practical purposes impossible, to match exactly the gain characteristics of the two receiving channels, each channel including a plurality of tubes, the volume control arrangements heretofore employed in both the phase-angle comparison and the amplitude comparison systems, have in general failed to secure equiamplitude indicator currents. In accordance with the present invention the gains of the two receiving channels are maintained equal during the entire direction determination operation.

It is one object to improve the operation and accuracy of high frequency direction finders.

It is another object of this invention to provide an accurate, direct and instantaneous indication of the line-direction of the incoming wave.

It is another object of this invention to render the gains in the two receiving channels of a phase-angle comparison direction finder and an amplitude comparison direction finder equal and independent of both the arrival direction and the fading of the wave incoming from the distant transmitter.

It is a further object of this invention to obtain a linear trace in an amplitude direction finding system comprising a cathode ray tube indicator and receiving channels having unequal phase angle shifts.

It is still another object of this invention to obtain a correct indication in phase-angle comparison and amplitude comparison direction finding systems utilizing receiving channels having equal delay characteristics but not necessarily equal phase-angle shifts.

In accordance with one embodiment of the invention, a local injection transmitter is associated with an amplitude comparison direction finder comprising a pair of crossed "Adcock" antennas connected through separate receiving channels to an indicator. The local transmitter is adjusted to transmit a frequency differing by an audio frequency from that of the incoming wave and its antenna is located on a line making 45 degrees with the quadrature axes of the Adcock antennas so that equiphase-angle, equiamplitude wave components are supplied to the Adcock antennas. The receiving channels each include a radio frequency amplifier, a first detector and an intermediate frequency amplifier. A second detector is connected to the output of each channel for detecting a current having an audio frequency equal to the difference between the injection wave frequency and the incoming wave frequency. Preferably, a beat frequency oscillator common to both channels is connected to the first detectors, although separate beat frequency oscillators may be used. The frequency-phase angle characteristics of the two receiving channels, over a frequency band having a width equal to the magnitude of the detected frequency, are similar, whereby the phase polarity relation and the phase angle relation of the antenna currents are reproduced in the detected currents, and a purely linear trace representing the line-direction of the incoming wave is obtained on the indicator. The frequency-phase angle characteristic represents the rate of phase angle shift with frequency change and hereinafter will be designated the "delay." In addition, the amplitude of the injection wave is considerably greater, for example, 26 decibels, than that of the incoming wave, so that in both receiving channels the volume is continuously controlled primarily in accordance with only the injection wave intensity, whereby the gains in the two receiving channels are maintained equal and independent of both the arrival direction and the fading of the wave incoming from the distant transmitter. The gains in the two receiving channels are, after initial adjustment of the individual volume control circuits, maintained equal regardless of whether or not the volume control characteristics of the two receiving channels are the same, although if they are not identical, their slopes should be the same.

The invention will be more fully understood from a perusal of the following specification taken in conjunction with the drawings on which like reference characters denote elements of similar function, and on which:

Fig. 1 illustrates one embodiment of the invention; Fig. 2 illustrates a plan view of the antenna system used in Fig. 1; and Fig. 3 is a curve used in explaining one feature of the invention.

Referring to Figs. 1 and 2, reference numerals 1, 2, 3 and 4 indicate four vertical large capacity type antennas positioned at the corners of a square for receiving a wave incoming from a distant transmitter and having a frequency $F_1$. Preferably, each antenna element comprises a wooden supporting structure completely covered by sheet copper. While elements of square cross section are illustrated, the cross section may be other than square as, for example, circular. Antennas 1 and 2 constitute one so-called "Adcock" directional antenna array 5 and antennas 3 and 4 constitute another Adcock antenna array 6, the arrays 5 and 6 being positioned on the axes 7 and 8, respectively, and having their directions of maximum radio action perpendicularly related. Numeral 9 designates two buried coaxially shielded line conductors of equal length connecting antennas 1 and 2 of array 5 to the input terminals 10 of the balanced-to-unbalanced transformer 11, and reference numeral 12 denotes two similar line conductors connecting antennas 3 and 4 of array 6 to the terminals 10 of balanced-to-unbalanced transformer 13. Each transformer assembly comprises a primary winding 14, shunt condenser 15, split secondary winding 16 and two condensers 17 connected in series. Numerals 18 and 19 designate unbalanced coaxial lines connecting, respectively, the output terminals of transformers 11 and 13 to the input terminals 20 of the radio receivers 21 and 22. Each of the radio receivers 21 and 22 comprises an impedance attenuation pad 23, radio frequency amplifier 24, first detector 25, intermediate frequency amplifier 26, a second or low frequency linear detector 27 for obtaining an audio frequency voltage from the intermediate frequency output and an audio amplifier 28 having a manual gain control. Numeral 29 designates an adjustable beat frequency oscillator common to receivers 21 and 22 and connected to the input terminals of the first detectors 25.

In accordance with well-known circuit arrangements, in each receiver a portion of the intermediate frequency output is supplied through an adjustable automatic volume control circuit 30 to amplifiers 24 and 26 as a grid bias. The gain control circuits 30 each comprise a rectifier and a smoothing circuit having a long-time constant for obtaining a direct current control voltage from the intermediate frequency output. Gain control circuits 30, are, by special design, made sharply responsive, that is, extremely "stiff," so that the receiver gains are the same, substantially, over a large intensity range for the wave incoming from the injection antenna 39. Pads 23 function to prevent overloading of the receivers when exceptionally strong incoming waves are received. The output terminals of receivers 21 and 22 are connected, respectively, to the plates 31 and 32 of the cathode ray tube indicator 33. Considered from a slightly different standpoint, the system of Fig. 1 comprises two distinct radio frequency-intermediate frequency receiving channels A and B. Channel A comprises the directive antenna array 5, coaxially shielded conductors 9, transformer 11, coaxial line 18 and the high frequency portion of receiver 21 comprising pad 23, radio frequency amplifier 24, first detector 25 and the intermediate frequency amplifier 26; and channel B comprises directive antenna array 6, coaxially shielded conductors 12, transformer 13, coaxial line 19 and the high frequency portion of the receiver 22 corresponding to the above-described portion of receiver 21. As explained below, the two receiving channels have equal gains and equal delay characteristics.

Numeral 34 designates a variable local source of radio frequency waves adjusted to supply a frequency $F_2$ differing from the incoming frequency $F_1$ by an audio frequency amount which is preferably in the order of 100 to 500 cycles, but which may be higher and is limited only by the band width of the receivers. The oscillator 34 is connected by line 35 through a modulator-amplifier 36 and the adjustable attenuator 37 to the coaxial line 38 and the non-directional vertical antenna 39 hereinafter called the "injection antenna." If desired, antenna 39 may be directional, the only requirement being that the intensities of the wave components emitted by the antenna 39 and received by antenna arrays 5 and 6 are, as received, equal. The antenna 39 is symmetrically located relative to the angularly related reference directions or antenna axes 7 and 8 and, preferably, is located on a line making an angle of 45 degrees with each of the above-mentioned axes and at a point sufficiently close to the arrays 5 and 6 to obviate ground factor differences in the paths extending between antenna 39 and the four vertical antenna elements 1, 2, 3 and 4. Numeral 40 denotes an auxiliary audio frequency oscillator for generating a wave $f=F_1-F_2$. As explained below, oscillator 40 may be connected by means of switch 41 to the modulator-amplifier 36, in the absence of the incoming wave $F_1$, for the purpose of calibrating the receivers 21 and 22.

In operation, the beat oscillator 29 is varied until receivers 21 and 22 are adjusted to receive a wave having an unknown direction as, for example, that indicated by arrow 42, and a frequency $F_1$, which may be any high frequency. The incoming wave establishes in the two vertical antennas of each array voltages having a phase angle relation dependent upon the azimuthal angle between the wave line-direction 42 and the respective array axis 7 or 8. Since, in each array, the two vertical antennas are connected in series through the primary winding 14 of the associated transformer 11 or 13, a radio frequency current having an amplitude corresponding to the above-mentioned angle is established by the absorbed voltages in the associated primary winding 14. Hence the currents in the primary windings of transformers 11 and 13 have an amplitude relation which is representative of the size of the angle between the wave line-direction and the axis or reference direction, for example, direction 7. The angle between the wave direction and axis 8 is the complement of the angle just mentioned. Also these currents have an instantaneous similar or opposite phase polarity relation dependent upon which of the two pairs of oppositely facing angles (C, C or D, D) includes the line-direction 42. More particularly, referring to Fig. 2 and assuming the four angles made by axis 8 and each of possible wave compass point directions 42, 43, 44 and 45 are equal and that the polarities have the same sense for direction 42, the polarities are of the same sense for direction 43 but of opposite sense for each of directions 44 and 45. The currents mentioned above do not represent the sense or point-direction of the incoming wave. In this connection the term "phase-polarity" as used herein should be sharply distinguished from the term "phase-angle" also used herein. By "phase-polarity" is meant the sense or direction of the energy, voltage of current, relative to a physical or geometrical point to or from which energy flows. Phase-polarity is ordinarily denoted by the mathematical sign plus or minus; is not indicative of a quantity and is not measured in degrees. By "phase-angle" is meant the electrical degrees measured on a time axis and having a value "$\cos 2\pi ft$", where $t$ is the distance on the axis from a reference point on said axis. It may be noted by way of further explanation, that a phase-angle change of 181 degrees in a current passing through a particular device reverses the sense or phase-polarity of the current, whereas with a phase-angle change of 179 degrees no reversal of phase-polarity occurs.

Simultaneously with the reception of frequency $F_1$ on arrays 5 and 6, the injection oscillator 34 supplies a wave $F_2$ to the local injection antenna 39 through modulator-amplifier 36, adjustable attenuator 37 and line 38, the switch 41 being normally opened and the audio oscillator 40 disconnected from the amplifier 36. The injection system comprising the antenna 39 emits a wave having a direction 46 and functions to establish in arrays 5 and 6 and the primary windings 14 of the respective transformers 11 and 13, equiamplitude equiphase-angle currents. Normally, attenuator 37 functions to render the wave $F_2$ from antenna 39, twenty-six decibels stronger (approximately 20 to 1 ratio) than the incoming frequency $F_1$. If necessary, any wide deviation in the above ratio may be corrected by adjusting attenuator 37.

After passing through transformers 11 and 13 the waves $F_1$ and $F_2$ are conveyed by lines 18 and 19, which are preferably of equal length, to the receivers 21 and 22. As explained below, in each receiver the waves are attenuated by pads 23 to a given value, amplified by the radio frequency amplifier 24 and then combined in the first detector 25 with a wave of frequency $F_3$ from the common beat oscillator 29. The intermediate frequency waves $F_1-F_3=F_4$ and $F_2-F_3=F_5$ are conveyed to amplifier 26. One portion of the output of intermediate frequency output of amplifier 26 is supplied to detector 27 and another portion is supplied to the rectifier in the gain control circuit 30. The linear detector 27 functions to detect a current having a low frequency $F_1-F_2=f$ and an amplitude variation corresponding to that of $F_1$ and independent of $F_2$. In this respect each receiver simulates a single side-band receiver for receiving a wave with a low percentage modulation and comprising a linear detector, wherein the audio output is proportional to the amplitude of the side band (incoming wave) and substantially independent of the carrier (injection wave). The two detected audio frequency currents $f$ in receivers 21 and 22, hereinafter denoted, respectively, $f_1$ and $f_2$ are then amplified by audio amplifiers 28 and impressed, respectively, on plates 31 and 32 of the cathode ray tube indicator 33. A linear trace, the orientation of which relative to the reference point or line on the indicator scale is indicative of the wave direction, is obtained on tube 33. As will now be explained, the linear trace is obtained, although the receiving channels A and B may have unequal phase-shift characteristics.

As pointed out previously, in the amplitude comparison systems heretofore employed, a highly desirable ideal linear cathode ray tube trace has not been readily obtained inasmuch as the receiving arrangements utilized were such that, to secure a linear trace, the phase-angle shifts in the receivers must be equal, as shown by curve 47 in Fig. 3; and it has not been feasible to construct receivers having equal phase-angle characteristics. Any deviation in the phase-angle relation between the indicator currents from a relation corresponding to that of the antenna currents causes the trace to split open and assume a quasi-elliptical shape. In accordance with the invention, the receiving channels A and B each including an antenna array and other radio frequency apparatus, as stated above, are designed to have equal delay characteristics. Thus, referring to Fig. 2, at each of the two radio frequency waves $F_1$ and $F_2$ the phase-angle shifts in the receiving channels A and B are substantially different. For example, for frequency $F_1$ the phase-angle shifts in the receiving channels A and B may be 60 and 63 degrees, respectively, and at frequency $F_2$ they may be, respectively, 80 and 83 degrees. The only requirement is that the relative phase shifts over a frequency band including $F_1$ and $F_2$ are equal. In other words, the delays or slopes of the curves 48 and 49, Fig. 3, should be the same. More accurately, the relative phase-angle shifts for the two particular frequencies $F_1$ and $F_2$ should be equal, regardless of the relative phase-angle shift for frequencies between these two frequencies. The delay characteristics may, of course, be non-linear and equal as shown, for example, by the dotted curved lines 50 and 51 in Fig. 3. With equal delays in the two receivers the detected currents have phase polarities, and also phase-angles, corresponding to the phase-angles of the antenna currents. Hence, in accordance with this invention and by reason of the introduction of an injection frequency $F_2$ differing by an audio frequency from the incoming frequency $F_1$, the phase-angle requirements for the radio frequency and intermediate frequency portions of the receivers included in amplitude-comparison systems are rendered less strict than heretofore; and equal phase-angle shifts in the detected currents may be obtained merely by using receivers having equal delays. It is a relatively simple matter to design and construct radio frequency and intermediate frequency elements having equal delays and unrelated phase-angle shifts. The audio amplifiers 28 should have equal phase shifts since only a single frequency is conveyed by each of these devices. Audio frequency amplifiers with equal phase shifts are relatively easy to construct since the wave-length is exceedingly long and the percentage change in phase-angle is small during the amplification process.

In connection with the above, sharp distinction should be made between the use of the "injection" oscillator and the associated equal delay receiving channels, as used in applicant's system, and the "phasing" oscillator and linear phase shift receivers used in phase comparison systems as, for example, the system disclosed in the H. T. Budenbom application Serial No. 741,372, mentioned above. In applicant's amplitude system, the orientation of the cathode ray tube trace indicates the wave direction; and the orientation is dependent primarily on the amplitude relation of the antenna currents. The direction indication is produced on the tube indicator even if the phase-angle between the detected currents is not actually correlated to the phase-angle between the antenna currents, provided that the deviation is not greater than 179 degrees, that is, not great enough to reverse the phase-polarity of the currents. Stated differently, in the amplitude comparison system, the phase-angle factor, when not large, relates to the sharpness of the indication, and not to its production. On the other hand, in the above-mentioned phase comparison system, any disagreement whatsoever between the phase-angle of the detected currents and the phase-angle of the absorbed components of the incoming wave materially affects the shape of the trace and hence prevents the establishment of, or utterly destroys, the directional indication. With the antenna array axis in the "in-bearing" position, in the phase system, a line indication is obtained, regardless of the amplitude relation of the currents; and the amplitude dissimilarity merely affects the line orientation which is not indicative of wave direction. Equal amplitudes are sometimes utilized in the phase system in order to secure, in the off-bearing condition, a sharp trace representative of the deviation of the system from the in-bearing position. Hence, in general, in the phase-angle comparison system, the amplitude factor relates to the sharpness of the indication obtained, and the correlation of the phase-angles of the detected and absorbed energies is a factor upon which the production, rather than the sharpness, of a trace representing the wave direction is dependent.

Referring again to Fig. 1 and considering the portion of the intermediate frequency output, $F_4$ and $F_5$ of amplifier 26 supplied in each receiver to the gain control circuit 30, the rectifier functions to produce a rectified control voltage having an intensity which, because of the large difference in intensity of waves $F_1$ and $F_2$, is a function primarily of the intensity of the injection wave $F_2$. The large difference in intensity of waves $F_1$ and $F_2$ and the smoothing circuit functions to eliminate the alternating current ripple or variation. For a given input intensity of wave $F_2$ the circuits 30 are adjusted to give the same gains. Inasmuch as the gain control characteristics, that is, the gain-grid bias curves of the two receivers may differ, and therefore the rectified voltages utilized to secure equal gains for the same input $F_2$ may differ, the slopes of the above-mentioned characteristics should be the same over the complete input level range of the receivers so that, for slight intensity variation in the substantially constant intensity of the injection wave $F_2$, the gains or changes in gain are the same. In other words, the receivers must respond equally or "track" each other upon changes in input intensity. The gain control requirement is analogous to the "delay" requirement illustrated by Fig. 3. If desired, prior to the reception of incoming frequency $F_1$, the two receivers may be calibrated as follows: The audio frequency oscillator 40 generating a frequency $f$ is connected by switch 41 to the modulator-amplifier 36 and, in each receiver 21 and 22, a detected frequency $f$ is obtained from the locally transmitted wave $F_2 \pm f$. The gains of the audio amplifiers 28 are adjusted so that their outputs are equal. After the preliminary adjustment, the audio oscillator 40 is disconnected from modulator-amplifier 36. Thus, in accordance with the invention, the gains of the two receivers are automatically maintained equal during the subsequent reception of the incoming wave $F_1$, without destroying the amplitude relation representing the wave direction, by supplying the unmodulated injection wave $F_2$ to the two receivers and obtaining from waves $F_1$ and $F_2$ the detected frequencies $f_1$ and $f_2$ and the rectified gain control current. Moreover, the gains of the receivers are maintained constant and independent of both the arrival direction and the fading of the incoming wave $F_1$.

Although the invention has been described in connection with a certain embodiment it should be understood that it is not to be limited to this particular embodiment inasmuch as the invention may be successfully practiced with other apparatus. In particular, the invention is applicable to other direction finding systems of either the phase or amplitude comparison type and is especially applicable to amplitude comparison systems using other antenna arrays as, for example, the arrays disclosed in Patent 2,119,607, E. J. Sterba, June 7, 1938, and comprising a non-directive antenna and a directive antenna or two horizontally polarized antenna-ground systems having different vertical plane characteristics.

What is claimed is:

1. In combination with a system for determining the direction of an incoming wave comprising a pair of receiving channels each having a separate automatic gain regulator controlled by the received energy, means for maintaining the gains in said channels equal and substantially independent of the arrival direction and fading of said incoming wave comprising a source of radio energy connected through paths of equal length to said channels for supplying to said channels control wave components each having a large magnitude relative to said incoming wave.

2. In combination with a direction finder comprising a pair of separate channels for receiving an incoming wave and indicating means, said channels each including a separate automatic gain control circuit, means for maintaining the gains of said channels substantially equal regardless of the direction and fading of the received wave comprising an energy source for continuously supplying to said channels components of a control wave having a large magnitude relative to said incoming signal.

3. In combination with a system for determining the direction of an incoming wave, said system comprising a pair of separate receiving channels connected to an indicator and each having an antenna and a separate gain regulator controlled by the received energies, means for maintaining the receiver gains substantially equal comprising a local transmitter including an antenna symmetrically located relative to said antennas for supplying to said channels a control wave having a large magnitude compared to that of the incoming wave.

4. In combination with an amplitude-comparison direction finder comprising a pair of separate receiving channels and a common indicator, said receiving channels each including a separate automatic volume control circuit controlled by the received waves, means for maintaining the gains of said channels equal during the direction finding determination comprising a local transmitter including an antenna for continuously supplying to said channels equiamplitude and equiphase energy components each having a large intensity relative to that of the incoming wave.

5. In combination, a pair of receiving channels each channel comprising a directive antenna connected to an amplifier, separate detectors connected to the outputs of said amplifiers, a common cathode ray tube indicator connected to said detectors, and means for obtaining low frequency indicator currents representing the intensities and the relative phase polarity of the energies received by said antennas, said means comprising a local transmitter including an antenna for supplying to said channels equiphase currents having a high frequency differing from the high frequency of the incoming wave by an amount equal to said low frequency, and said amplifiers having equal delay characteristics over a frequency band including said high frequencies.

6. In an amplitude-comparison direction finding system, a pair of receiving circuits for obtaining currents having an amplitude relation representing the incoming wave direction and each comprising an antenna connected through a separate radio frequency amplifier and a separate detector to a common cathode ray tube indicator, means for supplying to said antennas equiphase components of a wave having a frequency differing from that of the incoming wave, said amplifiers having substantially equal relative phase-angle shifts for frequencies having a difference equal to the difference between the frequencies of said waves.

7. In combination, a pair of directive antennas for receiving a desired wave and positioned for different directions of radio action, said antennas being connected through separate amplifiers to separate low-frequency detectors, means for supplying to said antennas and associated amplifiers a local wave having a frequency differing from that of the desired wave, said amplifiers having equal delay characteristics over a frequency band having a width at least as great as the magnitude of said frequency difference, and means connected to said detectors for comparing the intensities of their outputs.

8. In a radio system for determining the direction of a desired incoming wave, a plurality of separate transmission channels each including a directive receiving antenna and at least one amplifier, said antennas having angularly related directions of maximum radio action in a given plane, means for supplying to said antennas equiphase equiamplitude components of a local wave having a frequency differing from that of the incoming wave, said channels having similar frequency-phase angle characteristics over a frequency band having a width at least as great as the magnitude of the frequency difference between said incoming and local waves, detector means connected to said channels for obtaining from said incoming and local waves a pair of currents each having a frequency equal to the frequency difference between said waves and a cathode ray tube connected to said detectors for comparing the intensities of said currents.

9. In combination, a pair of directive receiving antenna arrays connected through separate receivers to an indicator, each receiver comprising a radio frequency amplifier, an intermediate frequency amplifier and a low frequency detector, an indicator connected to said detectors, said radio frequency amplifiers and intermediate frequency amplifiers having similar delay characteristics, means for supplying to the input terminals of said radio frequency amplifiers a wave having a frequency $F_2$ equal to $F_1 \pm f$ where $F_1$ is the frequency of the incoming distant wave and $f$ is an audio frequency corresponding to that of the detected currents.

10. In an amplitude-comparison direction finder comprising two receiving antenna arrays for obtaining from an incoming wave a pair of radio frequency currents having an amplitude relation representing the angles included between the incoming wave direction and two predetermined angularly related directions coinciding with the axes of said arrays, means for obtaining from said radio frequency currents a pair of currents having a given low frequency and an amplitude relation equal to the first-mentioned relation, said last-mentioned means comprising means for supplying to said antennas equiamplitude and equiphase radio frequency waves having a frequency differing from that of said incoming wave by an amount equal to said low frequency, separate amplifying channels connecting said antennas to separate detecting means and having similar delay characteristics over a frequency band having a width at least as great as the magnitude of said low frequency, and means for comparing the intensities of the outputs of said detectors whereby said angles may be determined.

11. In combination, a pair of radio receiving channels each comprising separate antenna arrays for obtaining from an incoming wave a pair of radio frequency currents having an amplitude relation representing the magnitudes of the angles included in a given plane between the line-direction of said wave and each of two predetermined angularly related reference line-directions coinciding with the axes of said arrays, said currents having similar or opposite instantaneous phase polarities depending upon which pair of oppositely facing angles formed by said reference directions include the wave line direction, means for obtaining from said currents a pair of low frequency currents having an amplitude relation and a phase polarity relation corresponding to those of said first-mentioned currents, said means comprising an oscillator for supplying to corresponding points in said channels equiamplitude equiphase components of a wave having a frequency differing from said radio frequency by an amount equal to said low frequency and an intensity in the order of twenty-six decibels greater than that of the incoming wave, at least one amplifier included in each of said channels, said amplifiers having similar frequency-phase angle characteristics over a frequency band at least as wide as the magnitude of said low frequency, a volume control circuit in each channel for equally regulating the gain of said channel amplifiers substantially in accordance with only the individual intensity of said components, separate detectors connected to the output of said channels, an indicator connected to said detectors for comparing the intensities of the detected current and effectively ascertaining their phase polarity relation, whereby the magnitude of the first-mentioned angles and the orientation of the wave line-direction relative to the aforementioned oppositely facing angles are determined.

CHARLES F. EDWARDS.
KARL G. JANSKY.

REFERENCES CITED

The following references are of record in the file of this patent:

UNITED STATES PATENTS

| Number | Name | Date |
|---|---|---|
| 2,182,950 | Steinhoff | Dec. 12, 1939 |
| 2,170,835 | Simon | Aug. 29, 1939 |
| 2,226,366 | Braden | Dec. 24, 1940 |
| 2,262,931 | Guanella | Nov. 18, 1941 |
| 2,083,495 | Black et al. | June 8, 1937 |